United States Patent [19]
Murooka et al.

[11] Patent Number: 6,086,978
[45] Date of Patent: Jul. 11, 2000

[54] POLYESTER FILM FOR METAL SHEET LAMINATING

[75] Inventors: Hirofumi Murooka; Kinji Hasegawa; Koji Kubo, all of Sagamihara, Japan

[73] Assignee: Teijin Limited, Osaka, Japan

[21] Appl. No.: 09/101,043

[22] PCT Filed: Oct. 24, 1997

[86] PCT No.: PCT/JP97/03870

§ 371 Date: Jun. 29, 1998

§ 102(e) Date: Jun. 29, 1998

[87] PCT Pub. No.: WO98/18851

PCT Pub. Date: May 7, 1998

[30] Foreign Application Priority Data

| Oct. 30, 1996 | [JP] | Japan | 8-288254 |
| Nov. 1, 1996 | [JP] | Japan | 8-291804 |
| Nov. 1, 1996 | [JP] | Japan | 8-291805 |

[51] Int. Cl.$^7$ .............................. B32B 5/16; B32B 15/08; B32B 27/36

[52] U.S. Cl. ...................... 428/141; 428/220; 428/323; 428/458; 428/910

[58] Field of Search .................. 428/480, 458, 428/216, 323, 141, 220, 219, 910; 525/444

[56] References Cited

U.S. PATENT DOCUMENTS

| 4,663,426 | 5/1987 | Wicker, Jr. et al. | 528/190 |
| 5,240,779 | 8/1993 | Ono et al. | 428/458 |
| 5,473,004 | 12/1995 | Ono et al. | 524/425 |
| 5,688,874 | 11/1997 | Hoffman | 525/444 |
| 5,753,377 | 5/1998 | Takahashi et al. | 428/480 |
| 5,885,689 | 3/1999 | Hasegawa et al. | 428/141 |

FOREIGN PATENT DOCUMENTS

| 3-86729 | 4/1991 | Japan . |
| 6-116486 | 4/1994 | Japan . |
| 6-179742 | 6/1994 | Japan . |
| 6-263893 | 9/1994 | Japan . |
| 7-082391 | 3/1995 | Japan . |
| 7-090094 | 4/1995 | Japan . |

*Primary Examiner*—Paul Thibodeau
*Assistant Examiner*—Ramsey Zacharia
*Attorney, Agent, or Firm*—Sughrue, Mion, Zinn, Macpeak & Seas, PLLC

[57] ABSTRACT

A film to be laminated onto a metal plate and molded, which includes a first copolyester including ethylene-2,6-naphthalene dicarboxylate as a main recurring unit or a blend of the first copolyester and a second copolyester including terephthalate as a main recurring unit. Both the first copolyester and the blend contain diethylene glycol in an amount of 0.05 to 8 mol %. This film has a water extraction of 0.5 mg/inch$^2$ or less and a center line surface roughness (Ra) of 4 to 30 nm.

25 Claims, No Drawings

POLYESTER FILM FOR METAL SHEET LAMINATING

FIELD OF TECHNIQUE

The present invention relates to a polyester film to be laminated onto a metal plate and molded. More specifically, it relates to a polyester film to be laminated onto a metal plate and molded, which is excellent in retort resistance and taste retainability and is suitable for the production of a metal can such as a drink can or a food can.

BACKGROUND TECHNOLOGY

Metal cans are generally coated on interior and exterior surfaces thereof for prevention of corrosion. Recently, there has been promoted the development of methods for obtaining corrosion resistance without using an organic solvent for the purpose of simplifying production process, improving sanitation and preventing pollution. As one of the methods, coating of a metal can surface with a thermoplastic resin film has been attempted. That is, studies are under way on a method for making cans by laminating a thermoplastic resin film onto a plate of metal such as tin, tin-free steel, aluminum or the like and then, drawing the laminated metal plate. Although a polyolefin film or polyamide film has been tested as this thermoplastic resin film, neither of them satisfies all the requirements consisting of moldability, heat resistance, odor retainability and impact resistance.

In the prior art, a polyester film, particularly a polyethylene terephthalate film is paid much attention as a film having well-balanced properties and there have been made some proposals based on this film. However, polyethylene terephthalate films involve such a problem that moldability is poor when heat resistance and odor retainability are excellent, while odor retainability and retort resistance are poor when moldability is excellent. It has been becoming clear that a copolyester film is excellent in moldability, heat resistance, retort resistance and odor retainability and is suitable for making cans (see Japanese Laid-Open Patent Application 3-86729).

However, it has also been becoming clear that when this copolyester film is used in a drink can or food can, it has a problem in that it spoils the taste of the contents of the can due to its insufficient taste retainability.

Meanwhile, Japanese Laid-Open Patent Application 6-263893 discloses a polyester film to be laminated onto a metal plate, which contains 0.01 to 1 wt % of diethylene glycol to improve impact resistance and enumerates homopolymers and copolymers of polyethylene naphthalate as the polyester.

Japanese Laid-Open Patent Application 6-116486 discloses a copolyester film to be laminated onto a metal plate, which contains 0.05 to 20 wt % of polyoxyalkylene glycol (including diethylene glycol) to improve flavor-retention property and enumerates homopolymers and copolymers of polyethylene naphthalate as the polyester.

Japanese Laid-Open Patent Application 7-82391 discloses a biaxially oriented polyester film to be laminated onto a metal plate and molded, which is composed of a copolyester comprising 80 to 95 mol % of 2,6-naphthalenedicarboxylic acid and 5 to 20 mol % of an aliphatic dicarboxylic acid represented by the following formula:

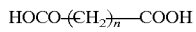

wherein n is an integer of 2 to 10, as acid components and ethylene glycol as a main glycol component, the copolyester having an intrinsic viscosity of 0.5 to 0.7 and containing a lubricant having an average particle diameter of 2.5 μm or less.

It is an object of the present invention to provide a polyester film to be laminated onto a metal plate and molded, which has more excellent odor retainability and good retort resistance while retaining excellent properties of a conventional polyester film such as moldability, heat resistance, odor retainability and impact resistance.

Other objects and advantages of the present invention will become apparent from the following description.

According to the present invention, firstly, the above objects and advantages of the present invention can be attained by a biaxially oriented polyester film to be laminated onto a metal plate and molded (may be referred to as "the first polyester film of the present invention" hereinafter):

(A) which comprises a copolyester comprising (a) 2,6-naphthalenedicarboxylic acid in an amount of 80 to 100 mol %, and either an aromatic dicarboxylic acid other than 2,6-naphthalenedicarboxylic acid or a combination of the aromatic dicarboxylic acid other than 2,6-naphthalenedicarboxylic acid and an aliphatic dicarboxylic acid in a amount of 20 to 0 mol % based on the whole dicarboxylic acid components, and (b) ethylene glycol in an amount of 72 to 99.95 mol %, diethylene glycol in an amount of 0.05 to 8 mol %, and a glycol other than ethylene glycol and diethylene glycol in an amount of 0 to 20 mol % based on the whole diol components, and having (c) a melting point of 198 to 268° C.;

(B) which has an extraction of 0.5 mg/inch$^2$ (0.0775 mg/cm$^2$) or less when subjected to an extraction treatment in ion exchange water at 120° C. for 2 hours; and (C) which has a center line surface roughness (Ra) of the film surface in the range of 4 to 30 nm.

Secondly, the above objects and advantages can be attained by a biaxially oriented polyester film to be laminated onto a metal plate and molded (may be referred to as "the second polyester film of the present invention" hereinafter):

(A) which comprises a blend of the first copolyester comprising (a) 2,6-naphthalenedicarboxylic acid in an amount of 80 to 100 mol % and a dicarboxylic acid other than 2,6-naphthalenedicarboxylic acid in an amount of 20 to 0 mol % based on the whole dicarboxylic acid components, and (b) ethylene glycol in an amount of 72 to 99.95 mol % and a glycol other than ethylene glycol in an amount of 0.05 to 28 mol % based on the whole diol components, and having (c) a melting point of 198 to 268° C., and the second copolyester comprising (a') terephthalic acid in an amount of 90 to 100 mol % and a dicarboxylic acid other than terephthalic acid in an amount of 10 to 0 mol % based on the whole dicarboxylic acid components, and (b') ethylene glycol in an amount of 90 to 99.95 mol % and a glycol other than diethylene glycol in an amount of 0.05 to 10 mol % based on the whole diol components, and having (c') a melting point of 230 to 255° C., the content of diethylene glycol being 0.05 to 8 mol % based on the total mole number of the diol components of the first copolyester and the second copolyester;

(B) which has an extraction of 0.5 mg/inch$^2$ (0.0775 mg/cm$^2$) or less when subjected to an extraction treatment in ion exchange water at 120° C. for 2 hours; and (C) which has a center line surface roughness (Ra) of the film surface in the range 4 to 30 nm.

The polyester film of the present invention will be detailed below. A description is first given of the first polyester film.

The copolyester constituting the first copolyester film of the present invention comprises 2,6-naphthalenedicarboxylic acid in an amount of 80 to 100 mol % of the total of all dicarboxylic acid components and ethylene glycol in an amount of 72 to 99.95 mol % of the total of all diol components.

The remaining 0 to 20 mol % of the total of all dicarboxylic acid components comprises either an aromatic dicarboxylic acid other than 2,6-naphthalenedicarboxylic acid or a combination of the aromatic dicarboxylic acid other than 2,6-naphthalenedicarboxylic acid and an aliphatic dicarboxylic acid. Of the two, the aromatic dicarboxylic acid other than 2,6-naphthalenedicarboxylic acid is preferred as the remaining dicarboxylic acid component.

Preferred examples of the aromatic dicarboxylic acid other than 2,6-naphthalenedicarboxylic acid include phthalic acid, isophthalic acid, terephthalic acid, 2,7-naphthalenedicarboxylic acid and the like. Illustrative examples of the aliphatic dicarboxylic acid used in combination of these aromatic dicarboxylic acids include oxalic acid, adipic acid, succinic acid, sebacic acid, azalaic acid, decanedicarboxylic acid and the like. They may be used alone or in combination of two or more.

The remaining 0.5 to 28 mol % of the total of all diol components consists of 0.05 to 8 mol % of diethylene glycol and 0 to 20 mol % of a glycol other than ethylene glycol and diethylene glycol. The total of all diol components preferably consists of 82 to 99.95 mol % of ethylene glycol and 0.05 to 8 mol %, more preferably 0.1 to 5 mol %, particularly preferably 0.5 to 3 mol %, of diethylene glycol.

When the content of diethylene glycol is less than 0.05 mol %, the effect of improving odor retainability is insufficient. On the other hand, when it is more than 8 mol %, the melting point of the obtained copolyester becomes too low with the result of deterioration in its heat resistance.

Preferred examples of the glycol other than ethylene glycol and diethylene glycol include propylene glycol, trimethylene glycol, tetramethylene glycol, hexamethylene glycol, cyclohexane dimethanol and the like. They may be used alone or in combination of two or more.

A known method can be used to cause diethylene glycol to be contained in the polyester film. For instance, diethylene glycol may be added in advance to an acid component and/or a glycol component which are/is a starting material(s) for a polyethylene-2,6-naphthalene dicarboxylate copolymer or may be added in any stages during a polycondensation reaction. Since diethylene glycol is usually by-produced in the polycondensation of a polyester containing ethylene glycol as a glycol component, the amount of diethylene glycol can be set to a predetermined amount by controlling the amount of the by-produced diethylene glycol.

In the present invention, the above copolyester is preferably produced using a germanium compound as a polymerization catalyst.

As the germanium catalyst,
(1) amorphous germanium oxide,
(2) fine crystalline germanium oxide,
(3) a solution obtained by dissolving germanium oxide in a glycol in the presence of an alkali metal or an alkaline earth metal or a compound of these metals, or
(4) a solution obtained by dissolving germanium oxide in water is used, for example.

The copolyester preferably contains germanium atoms derived from the above polymerization catalyst in an amount of 40 to 200 ppm, more preferably 60 to 150 ppm.

The above copolyester in the present invention has a melting point of 198 to 268° C. The lowest limit of 198° C. corresponds to the melting point of a copolyester in which the total of the amount of a dicarboxylic acid other than 2,6-naphthalenedicarboxylic acid based on the whole dicarboxylic acid components and the amount of a glycol other than ethylene glycol based on the whole diol components is almost 28 mol %. The upper limit of 268° C. is nearly equal to the melting point of a copolyester which comprises 2,6-naphthalenedicarboxylic acid as the only dicarboxylic acid component and ethylene glycol in an amount of 99.95 mol % and diethylene glycol in an amount of 0.05 mol % based on the whole diol components.

The copolyester preferably has an intrinsic viscosity (measured in o-chlorophenol at 35° C.) of 0.45 to 0.80 dl/g. The copolyester having the intrinsic viscosity in the above range has good processability.

The copolyester may further contain an antioxidant, heat stabilizer, ultraviolet absorber, antistatic agent and the like.

The first polyester film of the present invention has an extraction of 0.5 mg/inch$^2$ (0.0775 mg/cm$^2$) or less when subjected to an extraction treatment in ion exchange water at 120° C. for 2 hours.

When the extraction is more than 0.5 mg/inch$^2$, not only does the taste retainability deteriorate but a weight reduction at the time of a retort treatment also becomes large with the result of a decline in retort resistance.

The extraction is preferably 0.3 mg/inch$^2$ or less, more preferably 0.1 mg/inch$^2$ or less. The extract is believed to be substantially composed of a polyester oligomer.

To reduce the extraction to 0.5 mg/inch$^2$ or less, the amount of the oligomer contained in the copolyester may be reduced, or an unstretched film formed by melt extrusion may be stretched in a longitudinal direction in multiple stages. This multi-stage stretching in a longitudinal direction also has the effect of improving moldability for can making or deep drawing by lowering the surface orientation of the film.

The first polyester film of the present invention must have a surface roughness (Ra) of 4 to 30 nm, preferably 5 to 20 nm. The term "surface roughness (Ra)" means center line average roughness (JIS-B 0601) which will be described later.

Although it may seem odd that there is a correlation between the surface roughness of the polyester film and its taste retainability in a drink can or food can, it is presumed that the latent performance of the polyester film related to its taste retainability is very correlative to the specific range of its surface roughness at the time of preparing raw materials, stretching the film, laminating the film onto a metal plate and molding the film and that the surface roughness is actually related to the taste retainability. The latent performance, however, is still unknown at the moment. If the polyester film has a surface roughness (Ra) of 4 to 30 nm, it has excellent taste retainability to be used as a drink can or a food can.

In the polyester film of the present invention, it seems that when the surface roughness (Ra) is less than 4 nm, the handling property (winding property) of the film deteriorates, while when the surface roughness is more than 30 nm, the taste retainability of the film deteriorates (in other words, the taste of the contents of the can spoils.)

From another point of view, when the surface roughness (Ra) is less than 4 nm, its handling property (winding property) deteriorates while when the surface roughness (Ra) is more than 30 nm, pinholes readily form, thereby deteriorating odor retainability disadvantageously (that is, spoiling the taste of the contents of the can).

The average particle diameter and amount of a lubricant to be added to the copolyester are suitably selected in order to obtain the polyester film having the surface roughness (Ra) of 4 to 30 nm. It is desired to add a lubricant having an average particle diameter of 0.01 to 2 μm, preferably 0.05 to 1.5 μm, in an amount of 0.01 to 1 wt %. A mixture of lubricants may also be used that differ from one another in kind and average particle diameter.

Although the lubricant to be added to the copolyester may be either inorganic or organic, it is preferably inorganic. Illustrative examples of the inorganic lubricant include silica, alumina, titanium dioxide, calcium carbonate, barium sulfate and the like. Illustrative examples of the organic lubricant include silicone resin particles, cross-linked polystyrene particles and the like. A monodisperse lubricant having a particle diameter ratio (long diameter/short diameter) of 1.0 to 1.2 is particularly preferred from a viewpoint of pinhole resistance. Illustrative examples of the monodisperse lubricant include spherical silica, spherical silicone resin particles, spherical cross-linked polystyrene and the like.

The surface roughness (Ra) of the film is a center line average surface roughness obtained in accordance with JIS-B0601. A value (Ra:nm) given from the following equation is defined as film surface roughness when a portion of a measurement length L is taken from a film surface roughness curve in its center line direction, the center line of this portion is taken as the X axis, the direction of longitudinal magnification is taken as the Y axis and the roughness curve is expressed by Y=f(x).

$$Ra = 1/L \int_0^L |f(x)| dx$$

In the present invention, the surface roughness of 5 portions having a reference length of 2.5 mm are measured and an average value of four measurement values, excluding the largest value from the five measurement values, is taken as Ra.

The first polyester film of the present invention is preferably stretched in a longitudinal direction in multiple stages to improve moldability as described above. By stretching the film in a longitudinal direction in multiple stages, the surface orientation of the film is lowered and the moldability thereof is improved.

A description is subsequently given of the second polyester film of the present invention.

The second polyester film of the present invention is composed of a blend of the first copolyester (to be referred to as "copolyester A" hereinafter) and the second copolyester (to be referred to as "copolyester B" hereinafter).

The copolyester A comprises 2,6-naphthalenedicarboxylic acid in an amount of 80 to 100 mol % of the total of all dicarboxylic acid components and a dicarboxylic acid other than 2,6-naphthalenedicarboxylic acid in an amount of 20 to 0 mol %.

The dicarboxylic acid other than 2,6-naphthalenedicarboxylic acid may be either an aromatic dicarboxylic acid or an aliphatic dicarboxylic acid. Illustrative examples of the aromatic dicarboxylic acid and the aliphatic dicarboxylic acid are the same as those listed for the description of the first polyester film. Of the two, the aromatic dicarboxylic acid is more preferred as the dicarboxylic acid other than 2,6-naphthalenedicarboxylic acid.

The copolyester A comprises ethylene glycol in an amount of 72 to 99.95 mol % of the total of all diol components and a glycol other than ethylene glycol in an amount of 0.05 to 28 mol %.

Illustrative examples of the glycol other than ethylene glycol include diethylene glycol and those listed for the first polyester film.

The diol components of the copolyester A preferably comprise ethylene glycol in an amount of 82 to 99.95 mol % and diethylene glycol in an amount of 0.05 to 8 mol %. The diethylene glycol is contained more preferably in an amount of 0.1 to 8 mol %, particularly preferably 0.3 to 3 mol %. The reason why the above proportion of diethylene glycol is preferable and how to introduce diethylene glycol have already been set forth in the description of the first polyester film.

The copolyester A preferably contains germanium atoms derived from the polymerization catalyst in an amount of 40 to 200 ppm, more preferably 60 to 150 ppm. The polymerization catalysts are the same as those given in the description of the first polyester film.

The copolyester A has a melting point of 198 to 268° C. The lower limit and upper limit of the melting point correspond to those of the melting point of the copolyester A which comprises copolymer components other than 2,6-naphthalenedicarboxylic acid and ethylene glycol forming the copolyester A in an amount of 0.05 mol % and 28 mol %, respectively.

The copolyester A preferably has an intrinsic viscosity (measured in o-chlorophenol at 35° C.) of 0.45 to 0.80 dl/g.

The copolyester B (the second copolyester) comprises terephthalic acid in an amount of 90 to 100 mol % of the total of all dicarboxylic acid components and a dicarboxylic acid other than terephthalic acid in an amount of 10 to 0 mol %.

The dicarboxylic acid other than terephthalic acid is preferably contained in an amount of 5 to 0 mol %.

Illustrative examples of the dicarboxylic acid other than terephthalic acid are the same as those listed for the description of 2,6-naphthalenedicarboxylic acid and the copolyester A.

The copolyester B comprises ethylene glycol in an amount of 90 to 99.95 mol % of the total of all diol components and a glycol other than ethylene glycol in an amount of 0.05 to 10 mol %. Illustrative examples of the glycol other than ethylene glycol are the same as those listed for the description of the copolyester A.

The glycol other than ethylene glycol is preferably 0.05 to 8 mol %, more preferably 0.1 to 5 mol %, particularly preferably 0.3 to 3 mol % of diethylene glycol.

The copolyester B preferably contains germanium atoms derived from the polymerization catalyst in an amount of 40 to 200 ppm, more preferably 60 to 150 ppm. The polymerization catalysts are the same as those mentioned in the description of the first polyester film.

The copolyester B has a melting point of 230 to 255° C. The upper limit and lower limit of the melting point correspond to those of the melting point of the copolyester B which comprises copolymer components other than terephthalic acid and ethylene glycol forming the copolyester B in an amount of 0.05 mol % and 10 mol %, respectively. The copolyester B preferably has an intrinsic viscosity (measured in o-chlorophenol at 35° C.) of 0.50 to 0.80 dl/g.

The blend of the copolyester A and the copolyester B contains diethylene glycol in an amount of 0.05 to 8 mol % based on the total mole number of the diol components of the copolyester A and the diol components of the copolyester B. The blend preferably contains diethylene glycol in an amount of 0.1 to 5 mol %, more preferably 0.3 to 3 mol % based on the same basis. Below 0.05 mol %, the effect of improving taste retainability is insufficient, while above 8 mol %, the melting point of the blend becomes too low with the result of deterioration of heat resistance.

As for the ratio of the copolyester A to the copolyester B of the blend, the copolyester A is contained in an amount of 70 wt % or more, preferably 75 to 95 wt % and the copolyester B is contained in an amount of 5 to 25 wt % based on the total weight of the copolyester A and the copolyester B.

Both the copolyester A and the copolyester B may contain an antioxidant, heat stabilizer, ultraviolet absorber, antistatic agent and the like.

The second polyester film of the present invention has an extraction of 0.5 mg/inch$^2$ (0.0775 mg/cm$^2$) or less when it is subjected to an extraction treatment in ion exchange water at 120° C. for 2 hours, and has a center line surface roughness (Ra) of the film surface in the range of 4 to 30 nm, like the first polyester film. Therefore, as for items not described herein in connection with extraction and Ra, it should be understood that the description of the first polyester film can be directly applied to the second polyester film.

The above value of Ra can be achieved by incorporating fine particles (lubricant) having an average particle diameter of 0.01 to 2 μm and a particle diameter ratio of 1.0 to 1.2 into at least one of the copolyester A and the copolyester B in an amount of 0.01 to 1 wt %. The extraction is preferably 0.3 mg/inch$^2$ (0.0465 mg/cm$^2$) or less and Ra is preferably in the range of 5 to 20 nm.

The second polyester film of the present invention is preferably stretched in a longitudinal direction in multiple stages to improve moldability. By stretching the film in a longitudinal direction in multiple stages, the surface orientation of the film is lowered and the moldability thereof is improved.

The first polyester film and the second polyester film of the present invention preferably have each a thickness of 6 to 75 μm, more preferably 10 to 75 μm, particularly preferably 15 to 50 μm. The film having a thickness of less than 6 μm is easily broken at the time of molding, while the film having a thickness of more than 75 μm is of excessively high quality uneconomically.

A metal plate such as tin, tin-free steel, aluminum or the like is suitably used as a metal plate to be laminated with the polyester film of the present invention, particularly a metal plate for making cans.

The lamination of the polyester film on the metal plate can be carried out in accordance with the following methods (a) and (b).

(a) After the film is laminated on the metal plate heated at a temperature higher than the melting point of the film, the metal plate is quenched to make the surface layer portion (thin layer portion) of the film in contact with the metal plate amorphous and joined to the film.

(b) The film is coated in advance with a primer on its one surface to form an adhesive layer and laminated on the metal plate in such a manner that the surface is in contact with the metal plate. Known resin adhesives such as epoxy-based adhesives, epoxy-ester-based adhesives and alkyd-based adhesives can be used as the adhesive.

EXAMPLES

The following examples are given to further illustrate the present invention.

The characteristic properties of the polyester film of the present invention were measured and evaluated as follows.

(1) Deep Drawability-1

○: There is no abnormality in the film formation, and whitening or rupture of the molded film is not observed.

Δ: Whitening of the film is observed at a top portion of the can.

X: Rupture is observed in some parts of the film.

(2) Deep Drawability-2

○: The film is molded without abnormality and exhibits a current value of less than 0.1 mA in an anti-corrosion test on the film surface of the can inside (a current value is measured when electrodes are inserted into the can charged with a 1% NaCl aqueous solution and a voltage of 6V is applied with the can body as an anode. This test is called "ERV test" hereinafter).

X: Although no abnormality occurs in the film, the film exhibits a current value of 0.1 mA or more in the ERV test, and pinhole-like cracks starting from coarse lubricant particles are observed in the film when portions where electricity passes are observed under magnification.

(3) Retort Resistance

Well deeply drawn cans were filled with water, subjected to a retort treatment at 120° C. for 1 hour in the above sterilizer, and kept at 50° C. for 30 days. Ten cans were dropped on the polyvinyl chloride tiled floor from a height of 50 cm for each test and an ERV test was carried out on the inside of each can.

○: All 10 cans exhibited a current value of 0.1 mA or less.

Δ: One to five cans exhibited a current value of 0.1 mA or more.

X: Six or more cans exhibited a current value of 0.1 mA or more, or cracks were observed in the film after dropping.

(4) Taste Retainability

Well deeply drawn cans were filled with soda water and sealed up. They are kept at 37° C. for 60 days and opened to check a change in taste by an organoleptic test.

⊚: There was no change in taste.

○: There was almost no change in taste.

Δ: There was a slight change in taste.

X: There was a change in taste.

(5) Content of Diethylene Glycol (DEG)

About 10 mg of a sample was dissolved in a mixture solution of $CDCl_3$ and $CF_3COOD$ and measured by 600 MHz1H-NMR. The proportion of a peak value derived from the DEG component based on the total of the peak-integrated values of all glycol components is expressed by mol %.

(6) Measurement of Center Line Surface Roughness (Ra)

Ra was measured using a probe-type surface-roughness meter (SURFCORDER SE-30C) of Kosaka Laboratories Co., Ltd. at a probe radius of 2 μm, a measurement pressure of 0.03 g and a cut-off value of 0.25 mm.

Examples 1 to 12 and Comparative Examples 1 to 5

Polyethylene-2,6-naphthalate having an intrinsic viscosity of 0.65 was produced and pelletized by using germanium dioxide as a polymerization catalyst and changing polymerization conditions, the amount of diethylene glycol to be added, and the particle diameter and amount of spherical silica to be added as a lubricant. The pellets were molten at 300° C., extruded from a die, and quenched to be solidified to form an unstretched film. The unstretched film was then stretched to 1.7 times at 150° C. and 1.8 times at 160° C. in a longitudinal direction, and further stretched to 3.0 times in a transverse direction, and heat set at 180° C. to obtain various films which differed from one another in the content of diethylene glycol, the amount of an extracted oligomer and the surface roughness (Ra) as shown in Table 1. The amount of germanium remaining in polyethylene-2,6-naphthalate was 90 to 100 ppm in terms of atomic weight of germanium atom. All of the obtained films have a thickness of about 25 μm.

The thus obtained films which differed from one another in the content of diethylene glycol, the amount of extracted water and the surface roughness (Ra) were laminated on both sides of a 0.25 mm-thick tin-free steel plate heated at 260° C. After the resulting plate was cooled with water, 150 mm-diameter disks were cut out of the plate and then deep drawn in four stages using a drawing dice and punch to produce a 55 mm-diameter container having a seamless side (to be simply referred to as "can" hereinafter). The results are shown in Table 1.

TABLE 1

| | DEG (mol %.) | Melting point (° C.) | Amount of extracted water (mg/inch²) | Ra (nm) | Deep drawability-1 | Deep drawability-2 | Retort resistance | Taste-retainability | Winding property |
|---|---|---|---|---|---|---|---|---|---|
| C.Ex. 1 | 0.02 | 269 | 0.12 | 10 | X | X | ○ | Δ | good |
| Ex. 1 | 0.07 | 268 | 0.12 | 10 | ○ | ○ | ○ | ○ | good |
| Ex. 2 | 0.5 | 267 | 0.12 | 10 | ○ | ○ | ○ | ◎ | good |
| Ex. 3 | 3.0 | 261 | 0.12 | 10 | ○ | ○ | ○ | ◎ | good |
| Ex. 4 | 5.0 | 256 | 0.12 | 10 | ○ | ○ | ○ | ○ | good |
| Ex. 5 | 7.8 | 248 | 0.12 | 10 | ○ | ○ | ○ | ○ | good |
| C.Ex. 2 | 8.2 | 248 | 0.12 | 10 | ○ | ○ | ○ | Δ | good |
| Ex. 6 | 2.0 | 263 | 0.05 | 10 | ○ | ○ | ○ | ◎ | good |
| Ex. 7 | 2.0 | 263 | 0.2 | 10 | ○ | ○ | ○ | ○ | good |
| Ex. 8 | 2.0 | 263 | 0.4 | 10 | ○ | ○ | ○ | ○ | good |
| C.Ex. 3 | 2.0 | 263 | 0.7 | 10 | ○ | ○ | ○ | X | good |
| C.Ex. 4 | 2.0 | 263 | 0.12 | 3 | ○ | ○ | ○ | ○ | not good |
| Ex. 9 | 2.0 | 263 | 0.12 | 28 | ○ | ○ | ○ | ○ | good |
| Ex. 10 | 2.0 | 263 | 0.12 | 5 | ○ | ○ | ○ | ◎ | good |
| Ex. 11 | 2.0 | 263 | 0.12 | 20 | ○ | ○ | ○ | ◎ | good |
| Ex. 12 | 2.0 | 263 | 0.12 | 25 | ○ | ○ | ○ | ○ | good |
| C.Ex. 5 | 2.0 | 263 | 0.12 | 35 | ○ | ○ | ○ | X | good |

Ex.: Example; C.Ex.: Comparative Example

The cans coated with the polyester films of the present invention are excellent in deep drawability, retort resistance and taste retainability, do not spoil the taste of a refreshing drink, and is also satisfactory in terms of winding property at the time of the production of a film.

Comparative Example 6

A polyester film having a surface roughness (Ra) of 10 nm, which was formed of polyethylene terephthalate copolymerized with 12 mol % of isophthalic acid and having an intrinsic viscosity of 0.60, was used for the measurement and evaluation of its properties. It was satisfactory in terms of deep drawability-1 and 2, retort resistance and winding property, while its taste retainability was evaluated as Δ because there was a slight change in taste.

Examples 13 to 24 and Comparative Examples 7 to 11

Polyethylene-2,6-naphthalate copolymer copolymerized with 12 mol % of isophthalic acid and having an intrinsic viscosity of 0.65 was produced and pelletized by using germanium dioxide as a polymerization catalyst and changing polymerization conditions, the amount of diethylene glycol added, and the particle diameter and amount of spherical silica as a lubricant. The pellets were molten at 300° C., extruded from a die, and quenched to be solidified to form an unstretched film. The unstretched film was then stretched to 1.7 times at 150° C. and 1.8 times at 160° C. in a longitudinal direction, and further stretched to 3.0 times in a transverse direction, and heat set at 180° C. to obtain various films which differed from one another in the content of diethylene glycol, the amount of extracted water and surface roughness (Ra) as shown in Table 2.

The amount of germanium remaining in polyethylene-2,6-naphthalate was 90 to 100 ppm in terms of atomic weight of germanium atom. All of the obtained films have a thickness of about 25 μm.

The thus obtained films which differed from one another in the content of diethylene glycol, the amount of extracted water and the surface roughness (Ra) were laminated on a tin-free steel plate to make cans in the same manner as in Example 1 except that the heating temperature of the tin-free steel plate was changed to 230° C. The results are shown in Table 2.

TABLE 2

| | DEG (mol %.) | Melting point (° C.) | Amount of extracted water (mg/inch²) | Ra (nm) | Deep drawability-1 | Deep drawability-2 | Retort resistance | Taste-retainability | Winding property |
|---|---|---|---|---|---|---|---|---|---|
| C.Ex. 7 | 0.02 | 239 | 0.11 | 11 | X | X | — | — | good |
| Ex. 13 | 0.07 | 238 | 0.11 | 11 | ○ | ○ | ○ | ○ | good |
| Ex. 14 | 0.5 | 237 | 0.11 | 11 | ○ | ○ | ○ | ◎ | good |
| Ex. 15 | 3.0 | 231 | 0.11 | 11 | ○ | ○ | ○ | ◎ | good |
| Ex. 16 | 5.0 | 226 | 0.11 | 11 | ○ | ○ | ○ | ○ | good |
| Ex. 17 | 7.8 | 218 | 0.11 | 11 | ○ | ○ | ○ | ○ | good |
| C.Ex. 8 | 8.2 | 218 | 0.11 | 11 | ○ | ○ | ○ | Δ | good |
| Ex. 18 | 2.0 | 233 | 0.03 | 11 | ○ | ○ | ○ | ◎ | good |
| Ex. 19 | 2.0 | 233 | 0.18 | 11 | ○ | ○ | ○ | ○ | good |
| Ex. 20 | 2.0 | 233 | 0.35 | 11 | ○ | ○ | ○ | ○ | good |
| C.Ex. 9 | 2.0 | 233 | 0.76 | 11 | ○ | ○ | ○ | X | good |
| C.Ex. 10 | 2.0 | 233 | 0.11 | 3 | ○ | ○ | ○ | ○ | not good |
| Ex. 21 | 2.0 | 233 | 0.11 | 29 | ○ | ○ | ○ | ○ | good |
| Ex. 22 | 2.0 | 233 | 0.11 | 5 | ○ | ○ | ○ | ◎ | good |
| Ex. 23 | 2.0 | 233 | 0.11 | 20 | ○ | ○ | ○ | ◎ | good |
| Ex. 24 | 2.0 | 233 | 0.11 | 25 | ○ | ○ | ○ | ○ | good |
| C.Ex. 11 | 2.0 | 233 | 0.11 | 35 | ○ | ○ | ○ | X | good |

Ex.: Example.; C.Ex.: Comparative Example

Examples 25 to 29

The kind and amount of the third component to be copolymerized in Example 15 were changed as shown in Table 3.

The results are shown in Table 3. The cans coated with the polyester films of the present invention are excellent in deep drawability, retort resistance and taste retainability, do not spoil the taste of a refreshing drink and are also satisfactory in terms of winding property.

150° C. in a longitudinal direction, and further stretched to 3.0 times in a transverse direction, and heat set at 180° C. to obtain various films which differed from one another in the content of diethylene glycol, the amount of an extracted oligomer and surface roughness (Ra) as shown in Table 4. The amount of germanium remaining in the polyester films was 90 to 100 ppm in terms of atomic weight of germanium atom. All of the obtained films have a thickness of about 25 µm.

TABLE 3

| | Copolymerizable PEN* Copolymer component Composition | DEG mol % | Melting point (mol %) | (° C.) | Deep drawability-1 | Deep drawability-2 | Retort resistance | Taste- retainability | Winding property |
|---|---|---|---|---|---|---|---|---|---|
| Ex. 25 | IA** | 3 | 3.0 | 253 | ○ | ○ | ○ | ⊙ | good |
| Ex. 26 | IA | 7 | 3.0 | 243 | ○ | ○ | ○ | ⊙ | good |
| Ex. 27 | IA | 18 | 3.0 | 216 | ○ | ○ | ○ | ○ | good |
| Ex. 28 | IA | 22 | 3.0 | 206 | ○ | ○ | ○ | Δ~○ | good |
| Ex. 29 | SA*** | 12 | 3.0 | 231 | ○ | ○ | ○ | ○ | good |

Ex.: Examples
—: Could not be tested because deep drawing was impossible.
*PEN: polyethylene-2,6-naphthalene dicarboxylate
**IA: isophthalic acid
***SA: sebacic acid

Examples 30 to 41 and Comparative Examples 12 to 16

Polyethylene-2,6-naphthalate having an intrinsic viscosity of 0.64 and polyethylene terephthalate having an intrinsic viscosity of 0.65 were produced by using germanium dioxide as a polymerization catalyst and changing polymerization conditions, the amount of diethylene glycol added, and the particle diameter and amount of spherical silica as a lubricant. They were mixed together in a ratio of 85:15 to obtain a blend in the form of a pellet. The pellets were molten at 300° C., extruded from a die, and quenched to be solidified to form an unstretched film. The unstretched film was then stretched to 1.7 times at 140° C. and 1.8 times at The thus obtained films which differed from one another in the content of diethylene glycol, the amount of extracted water and surface roughness (Ra) were used to make cans in the same manner as in Example 1. The results are shown in Table 4.

TABLE 4

| | DEG (mol %.) | Amount of extracted water (mg/inch²) | Ra (nm) | Deep drawability-1 | Deep drawability-2 | Retort resistance | Taste- retainability | Winding property |
|---|---|---|---|---|---|---|---|---|
| C.Ex. 12 | 0.02 | 0.13 | 10 | X | X | — | — | good |
| Ex. 30 | 0.07 | 0.13 | 10 | ○ | ○ | ○ | ○ | good |
| Ex. 31 | 0.5 | 0.13 | 10 | ○ | ○ | ○ | ⊙ | good |
| Ex. 32 | 3.0 | 0.13 | 10 | ○ | ○ | ○ | ⊙ | good |
| Ex. 33 | 5.0 | 0.13 | 10 | ○ | ○ | ○ | ○ | good |
| Ex. 34 | 7.8 | 0.14 | 10 | ○ | ○ | ○ | ○ | good |
| C.Ex. 13 | 8.2 | 0.14 | 10 | ○ | ○ | Δ | Δ | good |
| Ex. 35 | 2.0 | 0.03 | 10 | ○ | ○ | ○ | ⊙ | good |
| Ex. 36 | 2.0 | 0.2 | 10 | ○ | ○ | ○ | ○ | good |
| Ex. 37 | 2.0 | 0.42 | 10 | ○ | ○ | ○ | ○ | good |
| C.Ex. 14 | 2.0 | 0.75 | 10 | ○ | ○ | ○ | X | good |
| C.Ex. 15 | 2.0 | 0.13 | 3 | ○ | ○ | ○ | ○ | not good |
| Ex. 38 | 2.0 | 0.13 | 27 | ○ | ○ | ○ | ○ | good |
| Ex. 39 | 2.0 | 0.13 | 5 | ○ | ○ | ○ | ⊙ | good |
| Ex. 40 | 2.0 | 0.13 | 20 | ○ | ○ | ○ | ⊙ | good |
| Ex. 41 | 2.0 | 0.13 | 24 | ○ | ○ | ○ | ○ | good |
| C.Ex. 16 | 2.0 | 0.13 | 36 | ○ | ○ | ○ | X | good |

Ex.: Examples; C.:Ex.: Comparative Examples
—: Could not be tested because deep drawing was impossible.

Examples 42 to 46 and Comparative Example 17

A polyester (A) and a polyester (B) shown in Table 5 were produced by using germanium dioxide as a polymerization catalyst and changing polymerization conditions, the amount of diethylene glycol added, and the particle diameter and amount of spherical silica as a lubricant. They were mixed together in a ratio shown in Table 5 to obtain a blend in the form of a pellet. The pellets were molten at 300° C., extruded from a die, and quenched to be solidified to form an unstretched film. The unstretched film was then stretched to 1.7 times at 140° C. and 1.8 times at 150° C. in a longitudinal direction, and further stretched to 3.0 times in a transverse direction, and heat set at 180° C. to obtain various films having a diethylene glycol content of 1.8 to 2.2 mol %, a water extraction of 0.1 to 0.15 mg/inch$^2$ and a surface roughness (Ra) of 8 to 10 nm. The amount of germanium remaining in the polyester films was 90 to 100 ppm in terms of atomic weight of germanium atom. All of the obtained films have a thickness of about 25 μm.

TABLE 5

| | Polyester (A) PEN[1] | | | | Polyester (B) PET[2] | | | |
|---|---|---|---|---|---|---|---|---|
| | Composition | mol % | Intrinsic viscosity[3] | Weight (%) | Composition | mol % | Intrinsic viscosity | Weight (%) |
| Example 42 | — | — | 0.62 | 85 | IA[4] | 3 | 0.63 | 15 |
| Example 43 | IA | 2 | 0.62 | 60 | IA | 2 | 0.63 | 40 |
| Example 44 | SA[5] | 2 | 0.61 | 70 | IA | 2 | 0.62 | 30 |
| Example 45 | IA | 2 | 0.62 | 85 | — | — | 0.65 | 15 |
| Example 46 | IA | 3 | 0.62 | 85 | SA | 2 | 0.62 | 15 |
| Comparative Example 17 | — | — | — | 0 | IA | 12 | 0.60 | 100 |

[1]PEN: polyethylene-2,6-naphthalene dicarboxylate
[2]PET: polyethylene terephthalate
[3]shows intrinsic viscosity of polymer before blending
[4]IA: isophthalic acid
[5]SA: sebacic acid The properties of the thus obtained films were measured and evaluated in the same manner as in Examples 30 to 41.

The results are shown in Table 6. The cans coated with the polyester films of the present invention are excellent in deep drawability, retort resistance and taste retainability, do not spoil the taste of a refreshing drink and are also satisfactory in terms of winding property. A can coated with a film which is formed only from a polyester (B) comprising ethylene terephthalate as a recurring unit (Comparative Example 17) is inferior in taste retainability.

TABLE 6

| | Deep drawability-1 | Deep drawability-2 | Retort resistance | Taste-retainability | Winding property |
|---|---|---|---|---|---|
| Example 42 | ○ | ○ | ○ | ⊚ | good |
| Example 43 | ○ | ○ | ○ | ○ | good |
| Example 44 | ○ | ○ | ○ | ⊚ | good |
| Example 45 | ○ | ○ | ○ | ⊚ | good |
| Example 46 | ○ | ○ | ○ | ⊚ | good |
| Comparative Example 17 | ○ | ○ | ○ | Δ | good |

—: Could not be tested because deep drawing was impossible.

The film to be laminated onto a metal plate and molded, provided by the present invention, is excellent in moldability, retort resistance and taste retainability, does not spoil the taste of a refreshing drink and is also satisfactory in terms of handling property.

What is claimed is:

1. A biaxially oriented polyester film to be laminated onto a metal plate and molded:
   (A) which comprises a copolyester comprising (a) 2,6-naphthalenedicarboxylic acid in an amount of 80 to 100 mol % and either an aromatic dicarboxylic acid other than 2,6-naphthalenedicarboxylic acid or a combination of the aromatic dicarboxylic acid other than 2,6-naphthalenedicarboxylic acid and an aliphatic dicarboxylic acid in an amount of 20 to 0 mol % based on the total dicarboxylic acid components, and (b) ethylene glycol in an amount of 72 to 99.95 mol %, diethylene glycol in an amount of 0.05 to 8 mol %, and a glycol other than ethylene glycol and diethylene glycol in an amount of 0 to 20 mol % based on the total diol components, and having (c) a melting point of 198 to 268° C.;
   (B) which has an extraction of 0.5 mg/inch$^2$ (0.0775 mg/cm$^2$) or less when subjected to an extraction treatment in ion exchange water at 120° C. for 2 hours; and
   (C) which has a center line surface roughness (Ra) of the film surface in the range of 4 to 30 nm.

2. The polyester film of claim 1, wherein the dicarboxylic acid components of the copolyester comprises 80 to 100 mol % of 2,6-naphthalenedicarboxylic acid and 20 to 0 mol % of an aromatic dicarboxylic acid.

3. The polyester film of claim 1, wherein the diol components of the copolyester comprises 82 to 99.95 mol % of ethylene glycol and 0.05 to 8 mol % of diethylene glycol.

4. The polyester film of claim 1, wherein diethylene glycol is present in an amount of 0.1 to 5 mol % of the total of all diol components of the copolyester.

5. The polyester film of claim 1, wherein the copolyester contains germanium atoms derived from a polymerization catalyst in an amount of 40 to 200 ppm.

6. The polyester film of claim 1, wherein the copolyester has an intrinsic viscosity (measured in o-chlorophenol at 35° C.) in the range of 0.45 to 0.80 dl/g.

7. The polyester film of claim 1, which has an extraction of 0.3 mg/inch$^2$ (0.0465 mg/cm$^2$) or less.

8. The polyester film of claim 1, which has an Ra of 5 to 20 nm.

9. The polyester film of claim 1, which has a thickness of 6 to 75 μm.

10. The polyester film of claim 1, which contains fine particles, having an average particle diameter of 0.01 to 2 μm and a particle diameter ratio (long diameter/short diameter) of 1.0 to 1.2, in an amount of 0.01 to 1 wt %.

11. A biaxially oriented polyester film to be laminated onto a metal plate and molded:
 (A) which comprises a blend of a first copolyester comprising (a) 2,6-naphthalenedicarboxylic acid in an amount of 80 to 100 mol % and a dicarboxylic acid other than 2,6-naphthalenedicarboxylic acid in an amount of 20 to 0 mol % based on the total dicarboxylic acid components, and (b) ethylene glycol in an amount of 72 to 99.95 mol % and a glycol other than ethylene glycol in an amount of 0.05 to 28 mol % based on the total diol components, and having (c) a melting point of 198 to 268° C., and the second copolyester comprising (a') terephthalic acid in an amount of 90 to 100 mol % and a dicarboxylic acid other than terephthalic acid in an amount of 10 to 0 mol % based on the total dicarboxylic acid components, and (b') ethylene glycol in an amount of 90 to 99.95 mol % and a glycol other than diethylene glycol in an amount of 0.05 to 10 mol % based on the total diol components, and having (c') a melting point of 230 to 255° C., the content of diethylene glycol being 0.05 to 8 mol % based on the total mole number of the diol components of the first copolyester and the second copolyester;
 (B) which has an extraction of 0.5 mg/inch$^2$ (0.0775 mg/cm$^2$) or less when subjected to an extraction treatment in ion exchange water at 120° C. for 2 hours; and
 (C) which has a center line surface roughness (Ra) of the film surface in the range 4 to 30 nm.

12. The polyester film of claim 11, wherein the blend contains the first copolyester in an amount of 70 wt % or more based on the total weight of the first copolyester and the second copolyester.

13. The polyester film of claim 11, wherein the blend contains the first copolyester in an amount of 75 to 95 wt % and the second copolyester in an amount of 5 to 25 wt % based on the total weight of the first copolyester and the second copolyester.

14. The polyester film of claim 11, wherein the dicarboxylic acid components constituting the first copolyester comprises 80 to 100 mol % of 2,6-naphthalenedicarboxylic acid and 20 to 0 mol % of an aromatic dicarboxylic acid.

15. The polyester film of claim 11, wherein the diol components constituting the first copolyester comprises 82 to 99.95 mol % of ethylene glycol and 0.05 to 8 mol % of diethylene glycol.

16. The polyester film of claim 11, wherein the first copolyester contains germanium atoms derived from a polymerization catalyst in an amount of 40 to 200 ppm.

17. The polyester film of claim 11, wherein the intrinsic viscosity (measured in o-chlorophenol at 35° C.) of the first copolyester is in the range of 0.45 to 0.80 dl/g.

18. The polyester film of claim 11, wherein the first copolyester contains fine particles, having an average particle diameter of 0.01 to 2 μm and a particle diameter ratio (long diameter/short diameter) of 1.0 to 1.2, in an amount of 0.01 to 1 wt %.

19. The polyester film of claim 11, wherein the diol components of the second copolyester contain diethylene glycol in an amount of 0.05 to 8 mol % as a glycol other than ethylene glycol.

20. The polyester film of claim 11, wherein the second copolyester contains germanium atoms derived from a polymerization catalyst in an amount of 40 to 200 ppm.

21. The polyester film of claim 11, wherein the intrinsic viscosity (measured in o-chlorophenol at 35° C.) of the second copolyester is in the range of 0.50 to 0.80 dl/g.

22. The polyester film of claim 11, wherein the blend contains diethylene glycol in an amount of 0.1 to 5 mol %.

23. The polyester film of claim 11, which has an extraction of 0.3 mg/inch$^2$ (0.0465 mg/cm$^2$) or less.

24. The polyester film of claim 11, which has an Ra of 5 to 20 nm.

25. The polyester film of claim 11, which has a thickness of 6 to 75 μm.

* * * * *